April 13, 1965 R. FELTS 3,178,714
THREE DIMENSIONAL DATA DISPLAY SYSTEM
Filed Sept. 19, 1960 5 Sheets-Sheet 1
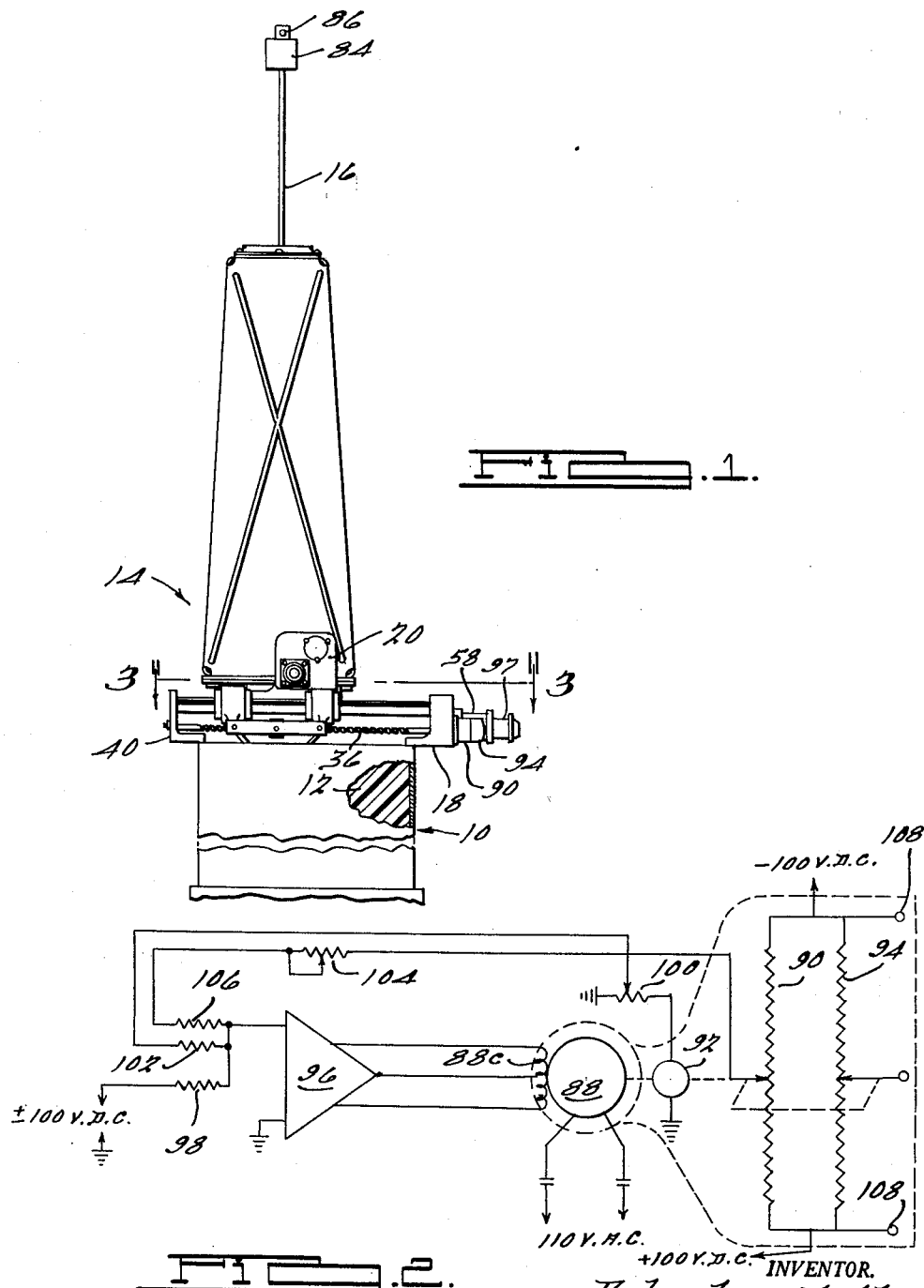
INVENTOR.
Robert Felts
BY
Dwight A. Lewis
ATTORNEY

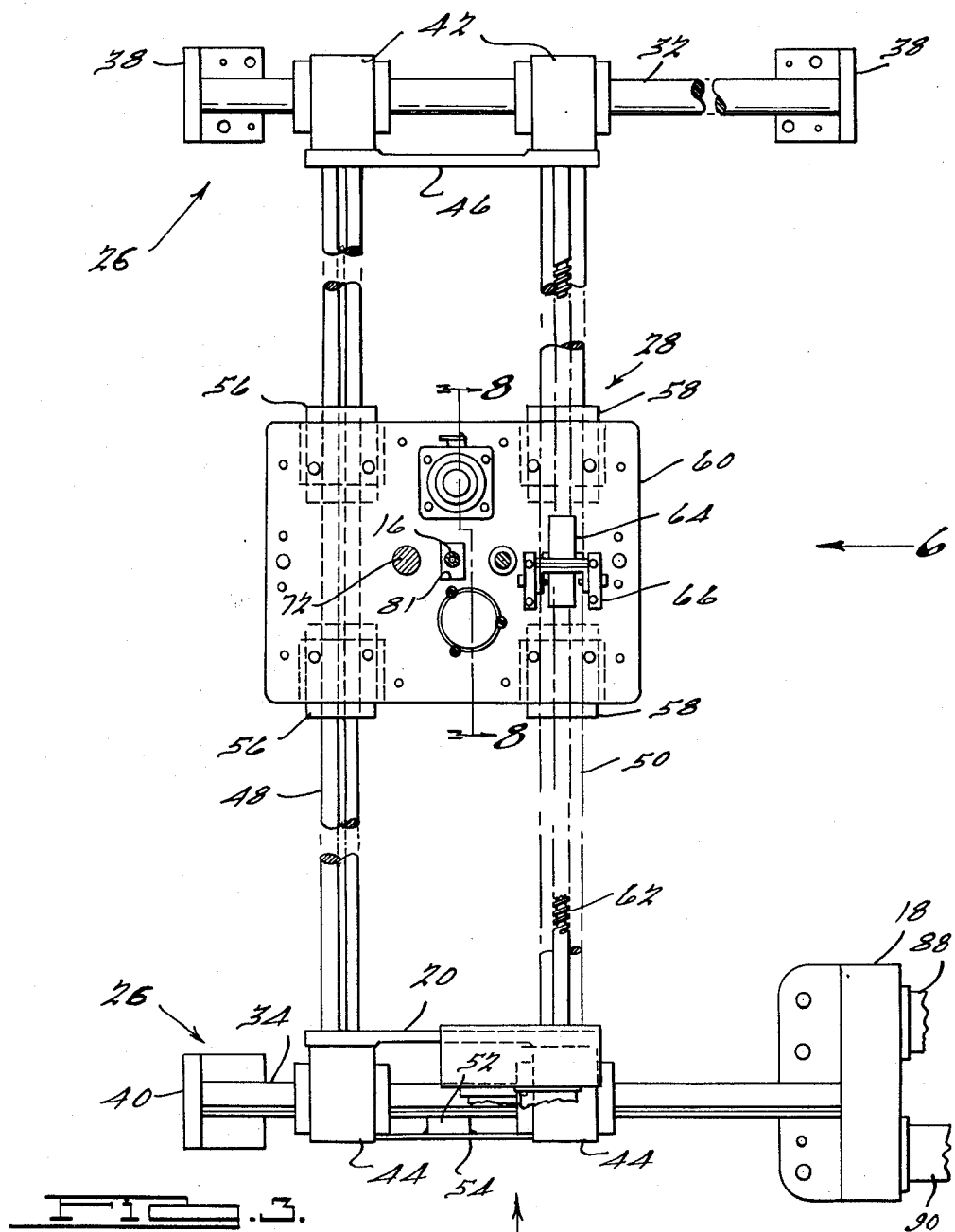

April 13, 1965
R. FELTS
3,178,714
THREE DIMENSIONAL DATA DISPLAY SYSTEM
Filed Sept. 19, 1960
5 Sheets-Sheet 3
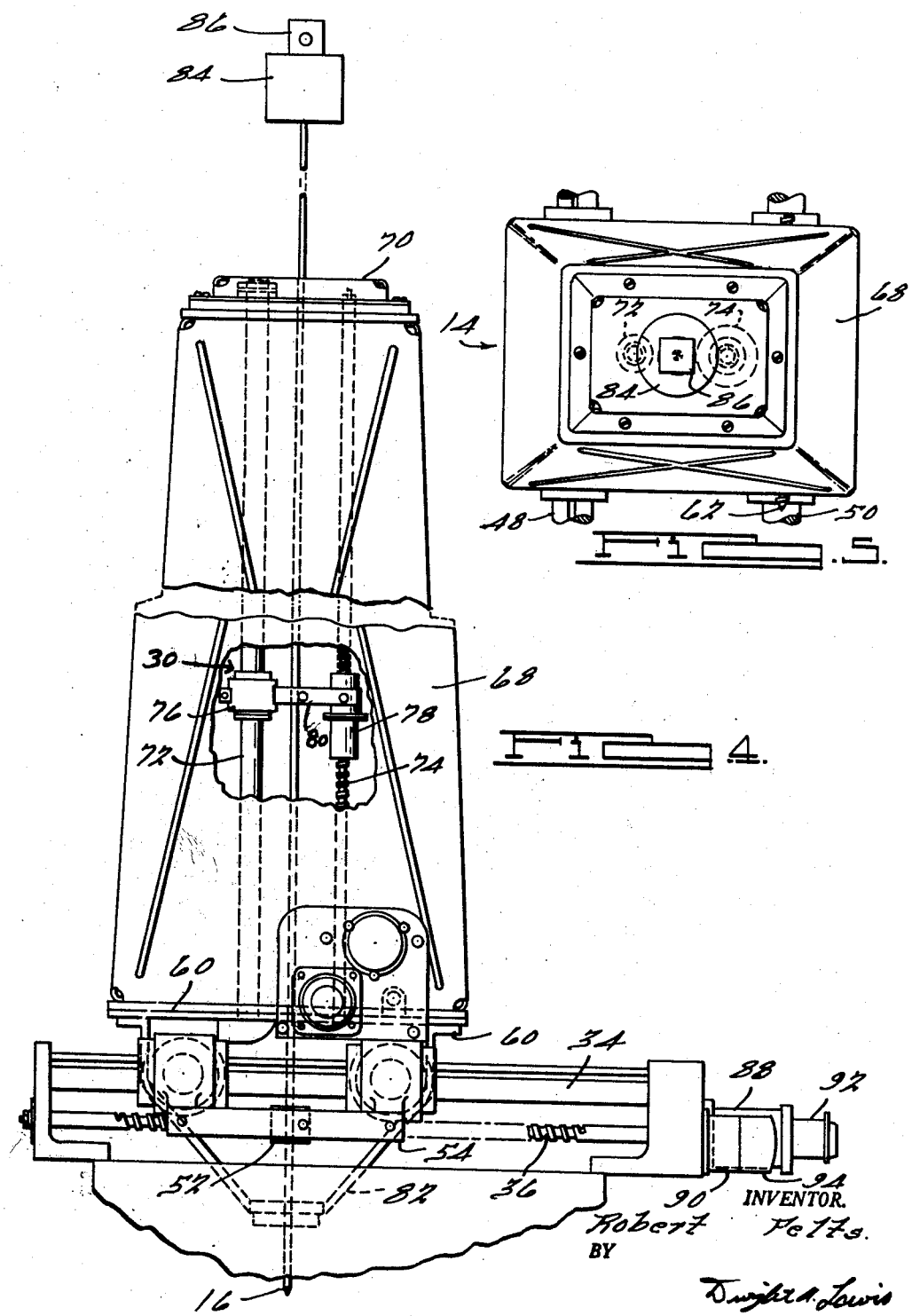
INVENTOR.
Robert Felts.
BY
Dwight A. Lewis
ATTORNEY April 13, 1965 R. FELTS 3,178,714
THREE DIMENSIONAL DATA DISPLAY SYSTEM
Filed Sept. 19, 1960 5 Sheets-Sheet 4
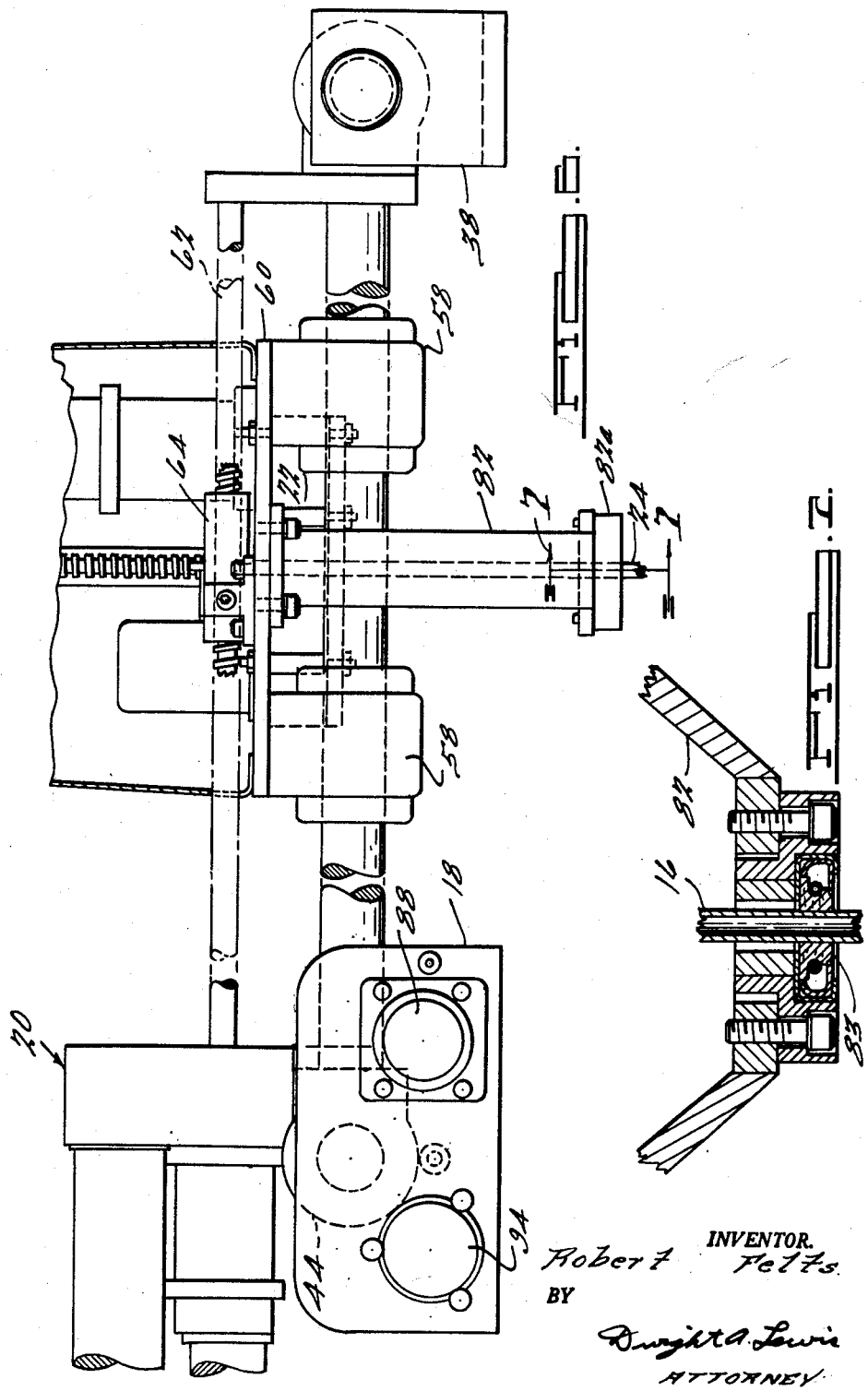
INVENTOR.
Robert Felts
BY
Dwight A. Lewis
ATTORNEY April 13, 1965 R. FELTS 3,178,714
THREE DIMENSIONAL DATA DISPLAY SYSTEM
Filed Sept. 19, 1960 5 Sheets-Sheet 5
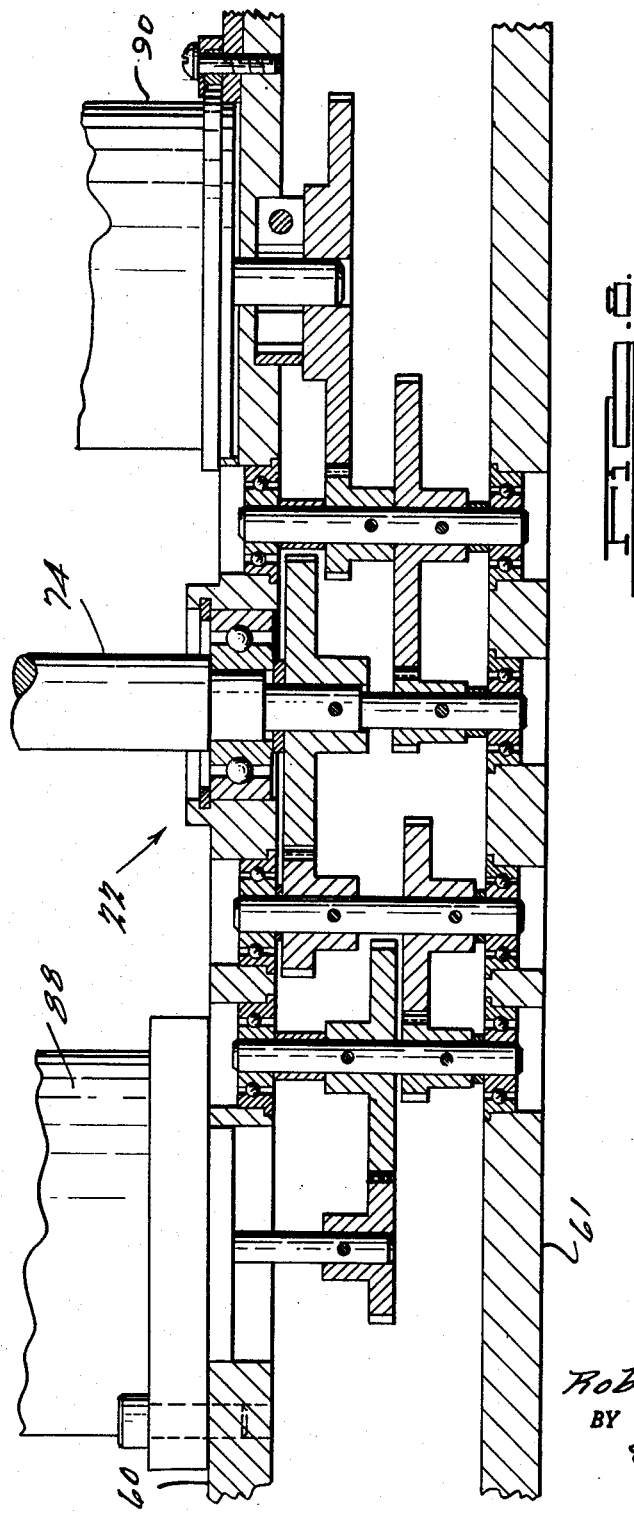
INVENTOR.
Robert Felts
BY
Dwight A. Lewis
ATTORNEY 3,178,714
THREE DIMENSIONAL DATA DISPLAY SYSTEM
Robert Felts, West Bloomfield Township, Oakland County, Mich., assignor, by mesne assignments, to the United States of America as represented by the Secretary of the Army
Filed Sept. 19, 1960, Ser. No. 57,046
6 Claims. (Cl. 346—8)

The present invention relates to a three dimensional data display system and more particularly to such a system wherein visual representation of a three axis system or movement is produced by an ink trace in a transparent tank of transparent gel.

More common methods of visual representation of data are two dimensional. For example, if one wishes to show simple geographical relationship a paper chart or map is satisfactory. Also, in plotting curves showing mathematical functions or the like, it is common practice to utilize draft paper whereon one variable is represented along the horizontal axis and a second variable along a vertical axis. However, in the representation of the movement of bodies in space and in the representation of mathematical data wherein there are more than two variables, it is desirable to provide some means of visual representation in a three dimensional manner.

There have been some suggestions in the prior art of utilizing cathode ray tubes to provide illusionary visual representation in a stereographic manner. However, this manner provides only an instantaneous representation.

The principal object of the present invention is, therefore, to provide for three dimensional visual representation of data in a system that permits retention of such display.

A further object of the present invention is to provide a three dimensional display system wherein movement of a body in space may be visually reproduced in a transparent tank of transparent gel by means of an ink trace.

A further object of the present invention is to provide a three dimensional display system wherein movement of a body in space may be visually compared with a predetermined desired movement of such body.

Another object of the present invention is to provide such a three dimensional data display system providing for storing and reproducing the data fed into the system whereby the identical representation may be reproduced at a subsequent time.

Other objects of this invention will appear in the following description and appended claims, reference being had to the accompanying drawings forming a part of this specification wherein like reference characters designate corresponding parts in the several views.

In the drawings:

FIG. 1 is a front view on a reduced scale of an embodiment of the present invention wherein the X-axis is horizontal, the Y-axis is normal to the plane of the drawing and the Z-axis is vertical, FIG. 2 is a schematic diagram of the electrical circuit controlling movement of the stylus along any one of the three axes, FIG. 3 is a top view of the carriage mechanism of FIG. 1 taken on the line 3—3 of FIG. 1 in the direction of the arrows, FIG. 4 is a front view taken in the direction of arrow 4 of FIG. 3 showing more detail than FIG. 1, FIG. 5 is a top view of the tower of FIG. 4.

FIG. 6 is a side view taken in the direction of arrow 6 of FIG. 3, with portions broken away for clarity, FIG. 7 is a cross section detail of the lower stylus support taken along the line 7—7 of FIG. 6 in the direction of the arrows, and, FIG. 8 is a detail of the X-axis gear box taken along the line 8—8 of FIG. 3 in the direction of the arrows.

Itis to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGS. 1, 3 and 4 of the drawings, the illustrated embodiment of the present invention comprises a tank 10 having transparent walls and containing a transparent gel 12. Positioned above the tank is a composite carriage mechanism 14 which carries a stylus 16 and provides for movement of the stylus along all of the axes X, Y and Z. In FIG. 1 the X-axis is horizontal and an X-axis gear box assembly 18 controlling the movement along the X-axis is visible at the right side of the figure. The Y-axis is normal to the plane of the drawing of FIG. 1 and a Y-axis gear box assembly 20 for control of movement of the carriage along the Y-axis is also visible. The Z-axis is vertical in FIG. 1 and a Z-axis gear box assembly 22 controlling movement along the Z-axis is partially visible in FIG. 3 and is shown in detail in FIG. 8.

In the description of the present embodiment of the invention, the use of the three dimensional data display system will be described in connection with the visual representation of movement of a body in space. It is to be understood, however, that such description is not to be taken as limiting as it is also within the contemplation of the present invention to utilize the X, Y and Z axes to represent movement of a body in an ocean or over land, or to represent variables in mathematical equations and the like. In the present description the X-axis represents the compass direction of movement of the body in space, e.g. azimuth; the Y-axis represents movement of the body through distance, e.g. range; and the Z-axis represents movement of the body vertically, e.g. elevation.

Referring to the drawings, the composite carriage mechanism can be explained in detail. In FIG. 3 the X-axis subcarriage 26 and the Y-axis sub-carriage 28 are clearly visible, while it will be necessary to refer to FIGS. 4–8 for the details of the Z-axis sub-carriage 30.

In FIG. 3, the X-axis sub-carriage 26 comprises spaced parallel waybars 32 and 34, a lead screw 36 (see FIG. 4) and the previously mentioned X-axis gear box assembly 18. The waybar 32 is supported at each end on the side walls of the tank 10 by L-shaped bracket 38. The waybar 34 is supported on the tank sidewalls at one end by an L-shaped bracket 40 and at the other end by the X-axis gear box assembly 18. The bracket 40 and the gear box assembly 18 also journal the lead screw 36.

Completing the X-axis sub-carriage and also providing the mounting for the Y-axis sub-carriage, are a pair of collars 42 that move longitudinally on waybar 32, a similar pair of collars 44 that move longitudinally on waybar 34, and the Y-axis waybars 48 and 50. The ends of each of the Y-axis waybars 48 and 50 are supported by one each of the pairs of collars 42 and 44 and thus are positioned perpendicular to the X-axis waybars. The pair of collars 42 is maintained in spaced relationship on the waybar 32 by means of a plate 46. The pair of collars 44 is maintained in spaced relationship on waybar 34 by means of the before mentioned Y-axis gear box assembly 20.

Thus, the X-axis waybars 32 and 34 mounted on the top edge of the tank and parallel to the plane of the top of the tank support the Y-axis waybars 48 and 50 which, in turn, mount the Y-axis sub-carriage 28. Movement along the X-axis is effected by rotation of the X-axis lead screw 36 and translation of this rotary movement into longitudinal movement by means of a nut 52 through which the lead screw is threaded and which is affixed to the pair of collars 44 by means of a bracket 54. Rotation of the lead screw 36 is effected by the X-axis gear box assembly 18 in a manner which will be described hereinafter.

Referring to FIG. 3 of the drawings, it has been noted that the waybars 48 and 50 are part of the X-axis sub-carriage 26 and also provide for mounting of the Y-axis sub-carriage 28. On the waybar 48 there is positioned a pair of collars 56. On the waybar 50 there is positioned a similar pair of collars 58. Affixed to the two pairs of collars 56 and 58 is a base plate 60 which maintains the collars in spaced relationship on their waybars and which also serves as the base plate for a tower assembly to be described in greater detail hereinafter. The Y-axis lead screw 62 is mounted in spaced parallel relationship above Y-axis waybar 50 and passes over the top of the plate 60. The Y-axis nut 64 threadingly engages the Y-axis lead screw 62 and is affixed to the plate 60 by means of a bracket 66. Thus, rotation of the Y-axis lead screw 62 will move the plate 60 along the Y-axis. Rotation of the Y-axis lead screw is effected by the previously mentioned Y-axis gear box assembly 20 in a manner to be described hereinafter.

In connection with FIG. 3 of the drawings, it was stated that the base plate 60 forms the base for a tower assembly. This tower assembly completes the Y-axis sub-carriage and is shown in a front view in FIG. 4 which is taken in the direction of the arrow 4 of FIG. 3. It includes the base plate 60, a rectangular sheet metal shell 68 which is affixed in a vertical position to the top face of the base plate 60, and a journal plate 70 which fastens on the top end of the sheet metal shell 68. The Z-axis waybar 72 is affixed at its upper end to the journal plate 70 and at its lower end to the base plate 60 and thus is positioned perpendicular to the Y-axis waybars 48 and 50 and also perpendicular to the X-axis waybars 32 and 34.

The Z-axis waybar 72 mounts the Z-axis sub-carriage 30 to which is affixed the stylus 16. The Z-axis sub-carriage includes the Z-axis lead screw 74 which is journaled at its upper end in plate 70 and at its lower end in plate 60 so as to be positioned in spaced parallel relationship to Z-axis waybar 72. A collar 76 is mounted on Z-axis waybar 72, a nut 78 is threadingly engaged around lead screw 74 and the collar and nut are connected by a strap 80 to which the stylus 16 is rigidly affixed. An opening 81 (FIG. 3) is provided in the tower base plate 60 and the stylus 16 extends therethrough and down into the gel 12 in tank 10. Referring to FIGS. 6 and 7 of the drawings, additional support means for the stylus can be seen comprising a bracket 82 extending downwardly from the lower face of plate 60 and supporting a bushing 83 through which the stylus passes. The bushing 83 is spaced below plate 60 so as to provide a second support for stylus 16 spaced from the point of attachment of the stylus to connecting strap 80. Thus, the stylus moves up and down along the Z-axis because it is carried by the strap connecting the collar 76 with the threaded nut 78 and the threaded nut 78 moves up and down in response to rotation of the lead screw 74. Rotation of the lead screw is accomplished by means of the Z-axis gear box 22 which will be described hereinafter.

Referring to FIG. 5 of the drawing, there is shown a top plan view of the tower clearly illustrating the sloping sides of the sheet metal shell 68 and the top journal plate 70 having the upper end of the waybar 72 affixed therein and the upper end of lead screw 74 rotatably journaled therein. There can also be seen in FIG. 5 an ink reservoir 84 which is affixed to the upper end of the stylus 16 and which is also more clearly shown in FIG. 4. The reservoir stores ink which feeds down through the stylus and out the lower end into the tank of gel. This flow may be a gravity feed or, if desired, a slight pressure may be applied to the ink reservoir by means of air under pressure or other suitable devices.

The reservoir includes a solenoid 86 which controls the flow of ink down through the stylus. In some instances, it is desired that the ink flow be continuous so as to produce a continuous trace line in the gel tank. In other instances, it is desirable to periodically interrupt the flow of ink so as to produce a broken trace line.

To reiterate the major points of the carriage arrangement that provide for movement along the X, Y and Z-axes: The X-axis waybars 32 and 34 are mounted in spaced parallel relationship across the top of the tank. A pair of collars 42 on waybar 32 and a pair of collars 44 on waybar 34 move there-along as dictated by movement of the nut 52 in response to rotation of the X-axis lead screw 36, the lead screw 36 in turn being rotated by the X-axis gearbox assembly 18. Extending between the pairs of collars 42 and 44 are the Y-axis waybars 48 and 50 which, in turn, have the pairs of collars 56 and 58 respectively that move there-along and carry with them tower base plate 60. Movement of the plate 60 along the Y-axis waybars is effected by the Y-axis nut 64, affixed to the plate, that follows along the Y-axis lead screw 62 which in turn is rotated by the Y-axis gear box assembly 20. The plate 60 then serves as the base for the tower assembly wherein the vertical waybar 72 is the Z-axis waybar and the lead screw 74 is the Z-axis lead screw with the collar 76 riding up and down on the waybar 72 being coupled across to the nut 78 by the strap 80 to which, in turn, is affixed the stylus 16. Thus, rotation of the lead screw 74, as controlled by the Z-axis gear box 22, moves the stylus vertically along the Z-axis.

Throughout the description to this point, reference has been made to gear box assemblies for the X, Y and Z-axes which would be described "hereinafter." Each of these gear box assemblies operate in the same manner. The operation of the gear box assembly for the Z-axis which has been given the reference numeral 22 will now be described. A view, partially in cross section, is illustrated in FIG. 8. This view has been taken on the line 8—8 of FIG. 3 in the direction of the arrows. FIG. 8 shows the Z-axis gear box assembly with the lead screw 74 extending upwardly from the top surface thereof. The only difference between this and the X and Y-axes gear boxes is that in the latter two the lead screw would extend downwardly when viewed as in FIG. 8.

Referring to FIG. 2, which is a schematic diagram of the electrical circuit, and to FIG. 8, which is a cross sectional view of the mechanical assembly, the operation of the gear box assembly can now be described in detail. The electrical circuit comprises the components of a closed circuit servo-mechanism, i.e., an amplifier, a motor, a selesyn generator and a feedback potentiometer. In addition the present invention provides a "read-out" potentiometer coupled to the feedback potentiometer.

The motive power to rotate the lead screw 74 is provided by a reversible A.C. motor 88. The motor is mounted on the plate 60 with its shaft extending into the gear box which is formed between plate 60 and a plate 61 spaced therefrom in parallel relationship. A first gear train connects the motor shaft to the lead screw. The first gear train matches the speed of the motor to the desired speed of travel of the lead screw, which, in the present illustration results in a movement of the carriage at a rate of one inch per second. Also mounted on the plate 60 is the feedback potentiometer 90 with the shaft that controls movement of its movable contact projecting into the gear box. A second gear train connects the lead screw to the potentiometer shaft. The gear ratios in this second chain are selected to correlate changes in potential of the feedback potentiometer with movement of the carriage so that a given movement of the carriage will produce a given change in the feedback potentiometer. This correlation is necessary to correlate feedback signal change, to carriage movement, to input signal change as will become apparent hereinafter.

A selsyn generator 92 is mounted on the end of the motor and its shaft is co-extensive with the motor shaft. A read-out potentiometer 94 is mounted on the end of the feedback potentiometer 90 and its shaft is likewise co-extensive with the shaft of the feedback potentiometer.

In FIG. 2 the dashed lines enclose the motor 88, the generator 92 and the two potentiometers 90 and 94 to indicate that these are mechanical components located on the gear box assembly. The dotted lines in the figure indicate mechanical connections. The mounting of the potentiometers end-for-end of the motor and selsyn generator end-for-end can be seen in FIG. 4. Although FIG. 4 shows, at the right hand side, the X-axis gear box, the mounting of these elements is the same on any of the three gear box assemblies.

In the schematic diagram of FIG. 2, the field coil of the motor is connected to a source of 110 v. A.C. and the control coil 88c is connected to an amplifier 96. The amplifier receives a signal indicating a change in the position of the body in space along the Z-axis. The signal is obtained from a radar system, or the like, which translates the movement into a D.C. voltage within the range, in the present example, of +100 volts D.C. The signal, say for example +20 volts, passes through the impedance matching resistor 98 to the amplifier 96. The amplifier thus causes excitation of the control coil 88c of the motor 88. Since the input signal is positive the motor moves in a forward direction. The selsyn generator 92, being mounted on the motor shaft, is also set in motion and its output is fed back to the amplifier through variable resistor 100 and second impedance mating resistor 102 to dampen the signal from the amplifier to the control coil of the motor. This damping effect prevents surging of the motor speed. The motor is then driving the lead screw through the first gear chain (FIG. 8) and the lead screw is, in turn, driving the movable contact of the feedback potentiometer 90 through the second gear chain. The two ends of the potentiometer winding are connected to a source of D.C. current equal to the possible voltage input range which can be handled by the amplifier, i.e., in this case +100 volts D.C. The movable contact of the potentiometer is connected to the amplifier through variable resistor 104 and impedance matching resistor 106. Thus, the motor will continue to move the lead screw until the fedback potentiometer 90 has been adjusted to the point where the feedback to the amplifier equals the input signal to the amplifier, i.e., the system is in-balance. At this point, the output signal from the amplifier to the control coil of the motor ceases, the motor stops, and, therefore, the lead screw stops thus leaving the carriage at the point dictated by the change in magnitude of the input signal, i.e., in this instance plus 20 volts. A change of position of the body on the Z-axis produces a change in the input signal thus upsetting the balance and again setting the motor in motion. If, for example, movement of the body produced an input signal of +10 volts, this would be a signal in the negative direction from the previous in-balance position of the system at +20 volts and, therefore, would produce reversing of the motor until the system had produced movement of the lead screw and movement of the feedback potentiometer back to the point where the feedback signal from the potentiometer was +10 volts. It is to be noted that the direction of movement is dictated by the direction of change in the input signal.

The additional feature provided by the present invention in relation to the servo-mechanism is the addition of the read-out potentiometer 94. The read-out potentiometer, as before noted, is mounted end-to-end with the feedback potentiometer, and as indicated by dotted lines in FIG. 2, the movable contact of the read-out potentiometer is coupled directly to the movable contact of the feedback potentiometer 90. Also, it can be seen in FIG. 2 that the same voltage is applied across the read-out potentiometer 94 as across the feedback potentiometer 90. Thus, by utilizing the test points 108 in conjunction with the movable contact of the read-out potentiometer an exact reading of the input signal strength in terms of the potentiometer can be obtained. This is useful in that continual information as to the movement of the stylus along the Z-axis can be recorded on a tape and subsequently the tape can be used to reproduce the exact condition. With the read-out potentiometer the device can also be utilized as a function generator. This is accomplished by moving the stylus along a trace line that has previously been put in the gel tank by manually adjusting input signals to the three axes servo-mechanisms. As the stylus follows the trace line the read-out potentiometer will generate functions appropriate to such movement.

Having described the details of the carriage movement, which in turn produces movement of the stylus, and having explained that the lower end of the stylus is immersed in the gel 12 in tank 10 whereby ink feeding from the end of the stylus produces a trace suspended in the gel, the details of the gel can now be described. The gel is transparent and of a semi-solid consistency such that the stylus may move freely therein without leaving a void while at the same time the ink trace will remain firmly suspended as it issues from the lower end of the stylus.

In preparing this gel it is desirable to utilize a water base because of its cost advantage and the final gel must be non-toxic so as not to present any danger in handling of the gel or operating the device.

The gel is prepared by dissolving a thickening agent in water with a dispersing agent to assure that the gel will be as transparent as possible. Suitable thickening agents are the now commercially available carboxy vinyl polymers of extremely high molecular weight. The carboxy vinyl polymers are provided in the form of fluffy, white, acid powders. Such powders, for example, are marketed by the B. F. Goodrich Company under the trademark "Carbopol." A suitable dispersing agent is polyethylene glycol. The Dow Chemical Company markets such dispersing agents under the trademark "Polyglycol" which are suitable. Since the thickening agent is acid, it is necessary to neutralize the gel with a base, such as sodium hydroxide, in order to avoid any problems in handling the gel or in operating the device. A satisfactory formula for the gel is as follows:

$H_2O$ ------------------ 3000 cc.
Carboxy vinyl polymer
  (Carbopol 940) ----- 9.7 grms.
NaOH --------------- 3.7 grms. dissolved in 200 cc. $H_2O$ to make an approximately 2% solution.
Polyethylene glycol
  (Polyglycol 15–200) -- 50 cc.

It has been found that the most satisfactory way to mix the gel is to first dissolve the thickening agent in the water, add thereto the NaOH solution and then add the dispersing agent to clear the gel. The simplest way to dissolve the thickening agent appears to be to sprinkle it on the water and let it stand until it is thoroughly soaked (usually overnight) before mixing. After the thickening agent is completely dissolved, the NaOH solution is added and then the dispersing agent. In each instance the mixing should not be too vigorous in order to avoid the accumulation of air bubbles in the gel. Any that do occur can be removed with a suction tube.

The gel has a specific gravity of only slightly greater than 1.0. In order that the ink trace will remain suspended in the gel when it flows from the end of the stylus, the specific gravity of the ink should not exceed .9 and the ink should also be non-polar in order to avoid dispersing. The ink utilized is an oil base having aniline dye or fluorescent pigment dissolved or suspended therein. Ordinary machine oil of about 40 S.A.E. or heavier is most suitable as a base. The amount of dye or pigment used is not especially critical. The determining factor is the desired intensity and this can be gaged visually when mixing the dye or pigment in the oil.

When it is desired to remove the ink trace from the gel tank, this can be accomplished very simply by means of a length of glass tubing coupled at one end to a conventional suction bottle or other vacuum source. The open end of the glass tube can be directed manually through the gel tank to draw out the ink trace. A certain amount of the gel will be removed in the process but this is not critical as the consistency of the gel is such that the remainder of the gel in the tank will settle into a homogeneous mass.

Having thus described my invention, I claim:

1. A three dimensional data display system comprising: a tank of transparent gel; a movable stylus having one end immersed in said gel; a container operatively connected to and mounted on said stylus; a trace material contained therein; means operatively connected to said container and selectively controlling the flow of said trace material through said end of said stylus into said gel; carriage mechanism for each axis of data representation and operatively engaged with said stylus to effect movement thereof; a closed circuit servo-mechanism associated with each said carriage mechanism and automatically operative to effect movement thereof along its axis of data representation in response to an electrical input signal representing the portion of the data to be displayed along that axis, and readout means associated with each said servo-mechanism to supply an output signal indicative of the movement effected by that servo-mechanism.

2. A three dimensional data display system as claimed in claim 1 and further characterized in that said last named means comprises a read-out potentiometer having its movable contact coupled to the movable contact of a feedback potentiometer of said servo-mechanism and movable therewith, said read-out potentiometer having a potential applied thereto equal to the potential applied to said feedback potentiometer.

3. A three dimensional data display system comprising: a tank of transparent gel; a movable stylus having one end immersed in said gel; a container operatively connected to and mounted on said stylus; a trace material contained therein; means operatively connected to said container and selectively controlling the flow of said trace material through said end of said stylus into said gel; carriage mechanism for each axis of data representation operatively engaged with said stylus to effect movement thereof along said display axis and including, a motor operatively engaging a lead screw to effect rotation of said lead screw, said lead screw operatively engaging a portion of said carriage mechanism to effect movement thereof along said data display axis, and a feedback potentiometer having its movable contact operatively engaged by said lead screw; and a closed circuit servo-mechanism associated with each said carriage mechanism including said motor, said lead screw and said feedback potentiometer and automatically responsive to an electrical input signal representing the portion of the data to be displayed along that axis.

4. A three dimensional data display system as claimed in claim 3 and further characterized in that a read-out potentiometer is associated with each said feedback potentiometer with the movable contact of said feedback potentiometer coupled to the movable contact of said feedback potentiometer and an equal potential is applied to both potentiometers.

5. A three dimensional data display system comprising: a tank of transparent gel; a movable stylus having one end immersed in said gel; means to feed a trace material from said end of said stylus into said gel; a carriage mechanism for each axis of data representation operatively engaged with said stylus to effect movement thereof along each axis of data representation and each carriage mechanism including, a motor operatively engaging a lead screw to effect rotation of said lead screw, said lead screw operatively engaging a nut portion of said carriage mechanism to effect movement thereof along said data display axis, and control circuit means including an amplifier for controlling said motor and further including means directly responsive to movement of the motor to dampen a control signal from said amplifier to a control coil of the motor and thereby prevent surging of the motor speed and erratic movement of the stylus.

6. A three dimensional data display system comprising: an open top transparent container of transparent gel; said gel comprising water having a thickening agent of carboxy vinyl polymer dissolved therein, a first pair of spaced parallel waybars positioned parallel to the top plane of said transparent container; a first sub-carriage movable along said first pair of waybars and including a second pair of spaced parallel waybars perpendicular to said first pair of waybars and parallel to the top plane of said transparent container; a second sub-carriage movable along said second pair of waybars and including a third waybar perpendicular to the top plane of said transparent container; a third sub-carriage movable along said third waybar; automatic means associated with each of said sub-carriages responsive to electrical signals representing the portion of the data to be displayed along that axis to effect movement of that sub-carriage; a stylus carried by said third sub-carriage and having one end immersed in said gel; a container operatively connected to and mounted on said stylus; a trace material contained therein; said trace material comprising a heavy machine oil of approximately 40 S.A.E. having a pigment suspended therein, said trace material being nonpolar and having a specific gravity slightly less than said gel; and means operatively connected to said container on said stylus and selectively controlling the flow of said trace material through said end of said stylus into said gel.

References Cited by the Examiner

UNITED STATES PATENTS

| | | | |
|---|---|---|---|
| 1,851,774 | 3/32 | Rogers | 346—1 |
| 2,775,758 | 12/56 | Munz | 346—110 |
| 2,911,538 | 11/59 | Munz | 346—146 |
| 2,927,833 | 3/60 | Maynard | 346—8 |
| 2,936,207 | 5/60 | Beaumont et al. | 346—8 |

FOREIGN PATENTS 566,696 9/57 Italy.

LEYLAND M. MARTIN, Primary Examiner.

NEWTON N. SOVEWELL, EMIL G. ANDERSON, SAMUEL BOYD, SAMUEL FEINBERG, Examiners.